US009906461B2

(12) United States Patent
Kludy et al.

(10) Patent No.: US 9,906,461 B2
(45) Date of Patent: Feb. 27, 2018

(54) METHODS AND SYSTEMS FOR CREATING AND MANAGING NETWORK GROUPS

(71) Applicant: Citrix Systems, Inc., Fort Lauderdale, FL (US)

(72) Inventors: Thomas M. Kludy, Cooper City, FL (US); Ashish Gujarathi, Parkland, FL (US); Ricardo Fernando Feijoo, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 577 days.

(21) Appl. No.: 14/161,553

(22) Filed: Jan. 22, 2014

(65) Prior Publication Data
US 2014/0344459 A1 Nov. 20, 2014

Related U.S. Application Data

(60) Provisional application No. 61/825,338, filed on May 20, 2013.

(51) Int. Cl.
*G06F 15/173* (2006.01)
*H04L 12/911* (2013.01)
*H04L 12/24* (2006.01)
*G06F 9/455* (2018.01)

(52) U.S. Cl.
CPC .......... *H04L 47/70* (2013.01); *H04L 41/0893* (2013.01); *G06F 9/455* (2013.01)

(58) Field of Classification Search
None
See application file for complete search history.

(56) References Cited

U.S. PATENT DOCUMENTS

| 7,991,859 | B1 | 8/2011 | Miller et al. |
| 8,260,893 | B1 | 9/2012 | Bandhole et al. |
| 2004/0233234 | A1 | 11/2004 | Chaudhry et al. |
| 2005/0193099 | A1* | 9/2005 | Reus ............ H04L 67/104 709/220 |
| 2006/0230103 | A1* | 10/2006 | Takamoto ........ H04L 69/40 709/203 |

(Continued)

FOREIGN PATENT DOCUMENTS

| CN | 102694667 A | 9/2012 |
| JP | 2012-085005 | 4/2012 |
| KR | 10-2007-0000230 | 1/2007 |

OTHER PUBLICATIONS

International Search Report and Written Opinion dated May 1, 2014; issued in related PCT Application PCT/US2014/012612 filed Jan. 22, 2014.

(Continued)

*Primary Examiner* — Mohamed Ibrahim
(74) *Attorney, Agent, or Firm* — Foley & Lardner LLP; Christopher J. McKenna

(57) ABSTRACT

The embodiments are directed to methods and devices for creating one or more network groups. The methods and devices can define a network group with one or more properties. The methods and devices can identify a plurality of isolated networks, and can assign the plurality of isolated networks to the defined network group. The methods and devices can assign machines to at least one of the plurality of isolated networks, wherein the network group enables unrestricted routing.

28 Claims, 8 Drawing Sheets

(56) References Cited

U.S. PATENT DOCUMENTS

| | | |
|---|---|---|
| 2009/0067436 A1 | 3/2009 | Gast et al. |
| 2012/0230223 A1 | 9/2012 | Taguchi |
| 2013/0297690 A1* | 11/2013 | Lucero .................. G06Q 50/01 709/204 |
| 2013/0336331 A1* | 12/2013 | Woerndle ............ H04L 12/4641 370/409 |
| 2014/0365662 A1* | 12/2014 | Dave ....................... H04L 67/10 709/226 |

OTHER PUBLICATIONS

Amazon Web Services, Amazon Elastic Compute Cloud: User Guide, API Version Oct. 15, 2013, Copyright © 2014 Amazon Web Services, Inc. and/or its affiliates. pp. 475-482 (6 pages).
Amazon Elastic Compute Cloud: User Guide, API Version Oct. 15, 2013, Amazon EC2 Security Groups, [retrieved on >Mar. 5, 2014<]. Retrieved from the internet: <URL: http://docs.aws.amazon.com/AWSEC2/latest/UserGuide/using-network-security.html> (5 pages).
Extended European Search Report dated Nov. 28, 2016; EPO Application 14800224.9.

* cited by examiner

METHODS AND SYSTEMS FOR CREATING AND MANAGING NETWORK GROUPS

CROSS-REFERENCE TO RELATED APPLICATIONS

This application claims the benefit of U.S. Provisional Application No. 61/825,338, filed May 20, 2013, which is herein incorporated by reference in its entirety.

BACKGROUND

Personal computers were originally created for a single user, and encompassed one or more of the following: one or more operating systems, native and third party applications, user settings, etc. Now, however, the concept of virtualization has made it easier for organizations to provide similar computational functionality, without the cost of purchasing and maintaining individual personal computers. Virtualization allows a user to interact with the operating system and applications stored therein in much the same way that they would a standalone personal computer. Desktop virtualization technology allows multiple instances of an operating system to be instantiated on a single server, thereby allowing multiple users to login to the server and complete the same tasks that they would, as if they had their own personal computer.

The architecture of the desktop virtualization environment is comprised of a collection of disparate networks. These networks can span floors in a building, or offices across several continents. The complexity of creating and maintaining these networks increases with the size of the network. Network administrators can spend weeks, if not months, properly configuring a network supporting a desktop virtualization environment.

DETAILED DESCRIPTION

Network administrators can spend a substantial amount of time in properly configuring a network supporting a desktop virtualization environment.

To configure a multi-tenant network environment, one of the requirements is that the tenants, which can be different organizations, are isolated from each other in such a way so a first tenant cannot send network packets to a different, second tenant. For example, in this type of environment, a proper setup would prevent packets from being transmitted from organization A to organization B. This isolation can occur by assigning each tenant to a different network.

In some multi-tenant management environments, pools of virtual machines have been built from the same image. The networks to which these virtual machines are connected to, are specified beforehand so that the virtual machines can be created as they are needed. While the virtual machines have been built from the same image, some of these virtual machines, despite being in the same pool, could be assigned to different networks. A problem can occur if a virtual machine that has been configured to communicate with one network is assigned to a different network. If this occurs, the virtual machine will not receive packets intended for it.

Another problem that can occur in a multi-tenant environment is the connection of too many machines to a network. This can result in too much network traffic, thereby congesting the network.

Embodiments in the present disclosure address one or more of the aforementioned problems by creating and managing groups of networks representing both physical and virtual networks by enabling unrestricted routing within the group and restricted routing between groups.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

Figure 1:
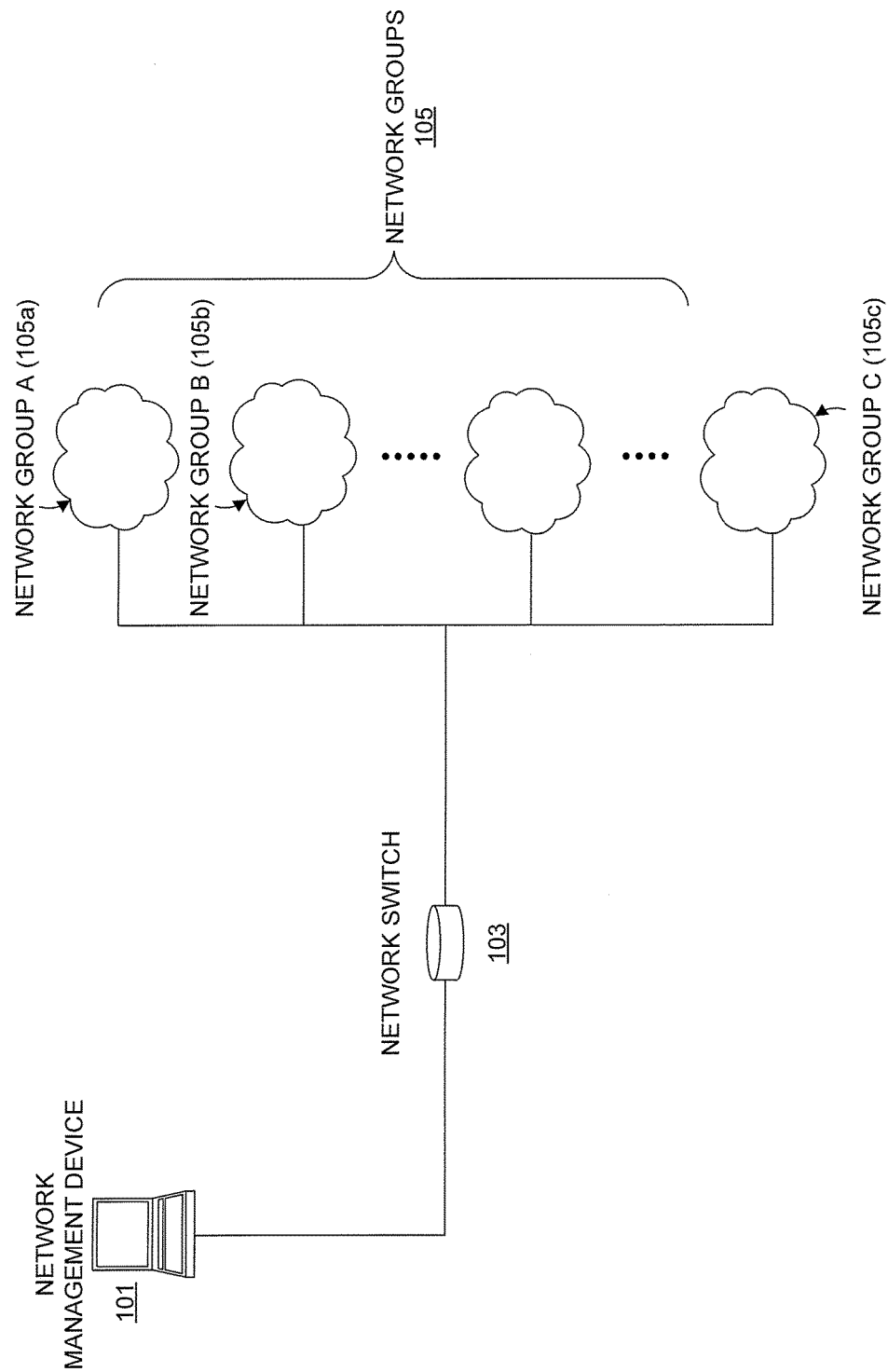
FIG. 1 is a block diagram of an exemplary system, consistent with embodiments of the present disclosure.

FIG. 1 is a network diagram of an exemplary system, consistent with embodiments of the present disclosure. Exemplary system 100 represents any type of system capable of creating and/or managing network groups over a network. Exemplary system 100 can include, in addition to other things, a network management device 101, a network switch 103, and one or more network groups 105.

Network management device 101 is a computer program and/or terminal that can access and control different devices and applications in one or more network groups 105. Network management device 101 can receive a request from one or more network groups 105, process the request, and send a response to the requesting network groups 105. For example, network management device 101 could receive a message from a network group 105*b*, requesting access to another network group 105*c*. Network management device 101 can determine if the requesting entity in network group 105*b* has permission to access network group 105*c*, then send a response to the requesting entity in network group 105*b* granting or denying access to network group 105*c*. Moreover, network management device 101 can define the network groups, which will further be described herein.

Network switch 103 is a computer program or computer networking device that connects devices on different networks. Network switch 103, for example, can be a server, network hub, repeater, network bridge, router, a layer-4 switch, or a layer-7 switch. Network switch 103 is a device that receives messages from any device connected to it and transmits the message to the device or set of devices for which the message was intended. Network switch 103 can send and receive messages to the devices connected to it at layers 1, 2, 3, 4, and 7 of the Open Systems Interconnection (OSI) model. Network switch 103 can also send and receive messages using any combination of the different layers.

Each network group 105 is a network of networks. Network group 105 is a collection of isolated networks that can have full routing amongst the isolated network members of that group. In some embodiments, network group 105 also indicates restricted routing with other network groups. Network group 105 can include one or more isolated networks, such as a Virtual Local Area Networks (VLAN), a subnet, or a security group. The networks in network groups 105 can be comprised of a combination of wired and wireless networks.

Figure 2:
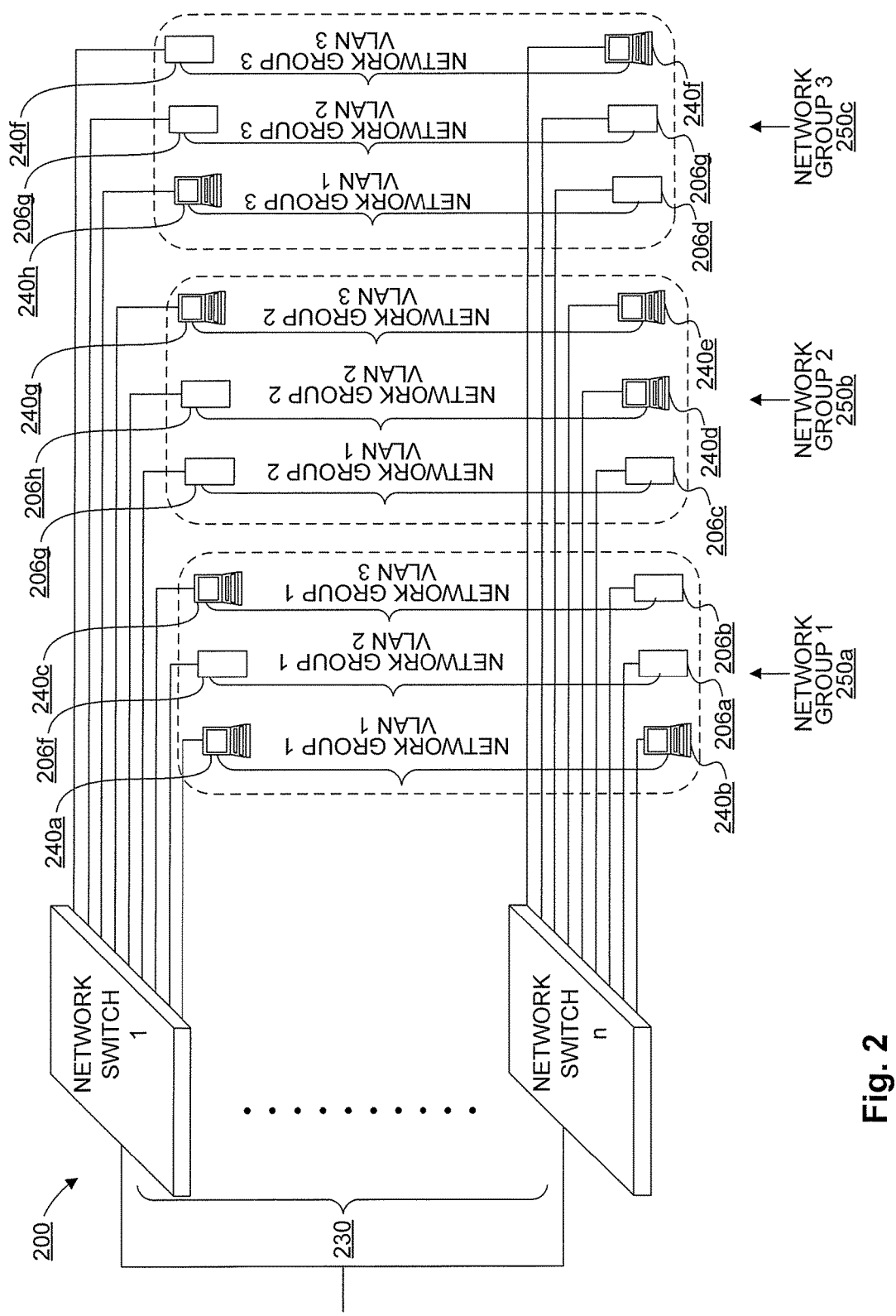
FIG. 2 is an exemplary network diagram illustrating connections between devices on different physical networks, consistent with embodiments of the present disclosure.

FIG. 2 is an exemplary network diagram illustrating connections between devices on different physical networks, consistent with embodiments of the present disclosure. One or more clients 240 and/or one or more servers 206 can transmit data over a network 230 installed between machines and appliances within computing environment 200. Network 230 can comprise one or more subnet, and can be installed between any combination of the clients 240, servers 206, computing machines and appliances included within the computing environment 200. In some embodiments, network 230 can be: a local-area network (LAN); a metropolitan area network (MAN); a wide area network (WAN); a primary public network (e.g., the Internet); or a primary private network. Each Virtual Local Area Network (VLAN) consists of a one or more clients 240 and one or more servers 206 (e.g., a computing device 306), which can either be physical machines running a single standalone operating system, or a virtualization server (such as virtualization server 601 described in FIG. 6) hosting multiple virtual machines, each of which has an operating system running on it. Multiple VLANs can be grouped into a single network group 250. And while FIG. 2 focuses on VLANs as being in network group 250, it is appreciated that any isolated network, such as a subnet and security group, can be included in network group 250.

To perform this grouping, one or more network groups (e.g., network group 250) are first defined at network management device 101. The administrators input grouping information into network management device 101 to define network groups.

After the one or more network groups are defined, network management device 101 defines properties of those one or more network groups. The properties of the network group can include assigning a maximum number of machines for each VLAN in the network group. In some embodiments, the properties can include additional routing properties of that group, such as whether that network group is isolated, private, or shared. For example, a "shared" network group allows ingress network traffic from multiple tenants; a "private" network group allows egress network traffic to access some limited shared application components; and an "isolated" network group can prevent any ingress or egress traffic other than from a specific set of users.

Network management device 101 can provide information for identifying the VLANs to be used for grouping. In some embodiments, the administrator defines the VLAN, while in other embodiments the information for identifying the VLANs is imported from one or more hypervisor. Each VLAN can be assigned a "maximum number of machines."

Network management device 101 can assign the identified VLANs into network groups (e.g., VLANs 1, 2, and 3 of network group 1 250*a*). This indicates that the VLANs have full routing in place between them, and have appropriate routing between the VLANs in the group and other network groups. In some embodiments, the configuring of the routing is performed automatically by an orchestration system. The orchestration system can configure routing automatically between all of the VLANs in the network group, and appropriate routing between all of the VLANs in multiple network groups.

Network management device 101 can receive information for associating each network group with an appropriate "scope." The scope defines a set of machines and/or applications that can send any packet to each other. In this example, the machines of a network group would not necessarily be restricted by a router unless the machines attempt to send packets to other machines outside of the scope.

In the case of existing machines (e.g., physical machines 240 and/or virtual machines 206), network management device 101 defines the specific VLAN that each machine is located on. This definition can occur by tagging each machine to each VLAN. When machines are needed within a "scope," network management device 101 either selects physical machines that are located on one of the VLANs in the network group associated with the scope; or, it creates a new virtual machine on one of the VLANs in the network group associated with the scope. In the latter case, network management device 101 ensures that the maximum number of machines for a single network is not exceeded. If there are not enough machines available to meet the needs of a "scope," network management device 101 raises an alert to inform the administrator that one or more additional VLANs are needed in that network group. When networks are added to a network group, network management device 101 can continue creating virtual machines in any scope associated with that group that needs additional machines, using the newly added VLANs.

Figure 3:
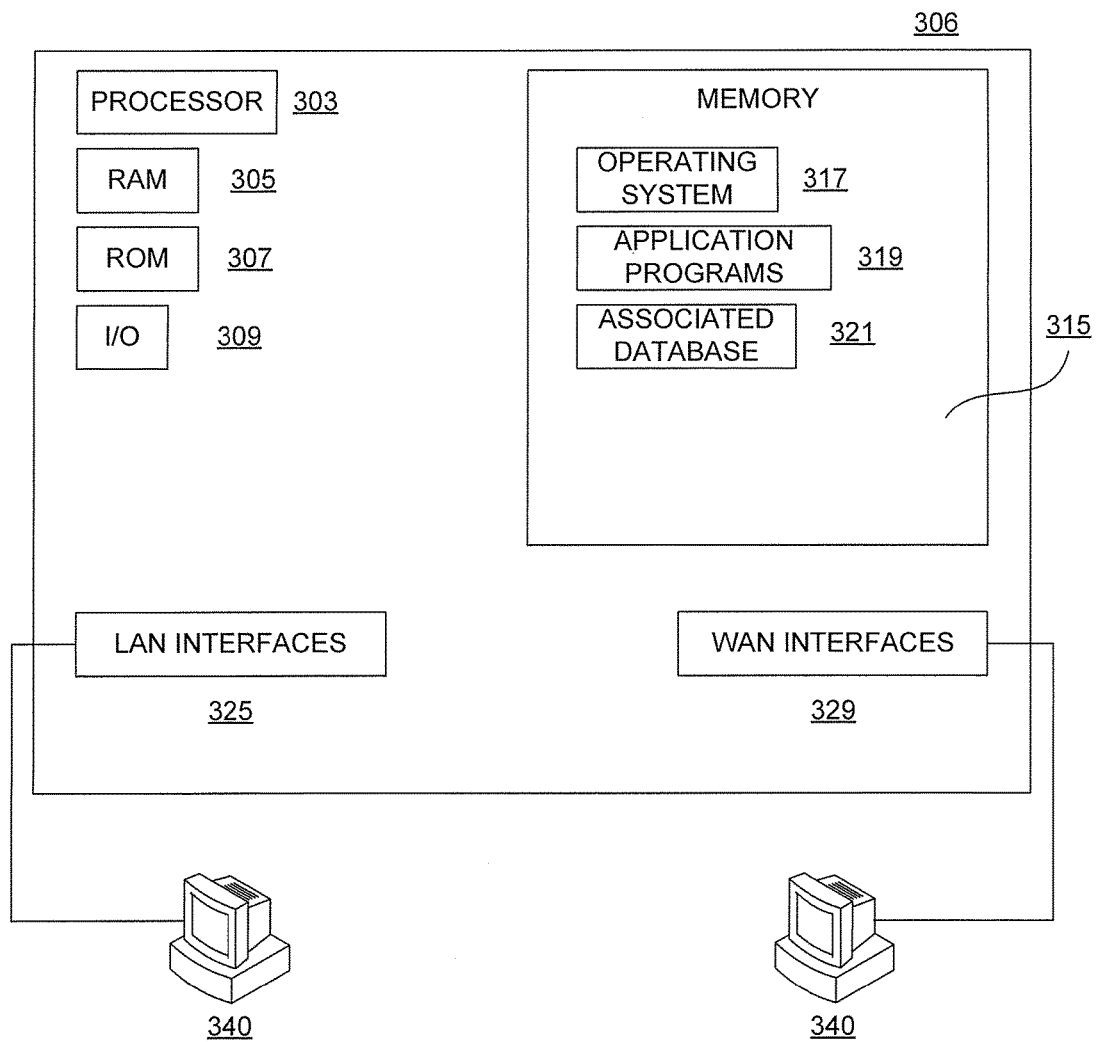
FIG. 3 is an exemplary operating environment consistent with the embodiments of the present disclosure.

FIG. 3 is an example block diagram of a computing device 306 in an example computing environment consistent with embodiments of the present disclosure. According to one or more aspects, computing device 306 can be a server in a single-server or multi-server remote desktop system configured to provide physical or virtual machines for client access devices. Computing device 306 can have a processor 303 for controlling overall operation of the server and its associated components, including random access memory (RAM) 305, read-only memory (ROM) 307, input/output (I/O) module 309, and memory 315.

I/O module 309 can include a mouse, keypad, touch screen, scanner, optical reader, and/or stylus (or one or more other input devices) through which a user of computing device 306 can provide input, and can also include one or more speakers for providing audio output and a video display device for providing textual, audiovisual, and/or graphical output. Software can be stored within memory 315 and/or other storage to provide instructions to processor 303 for enabling computing device 306 to perform various functions. For example, memory 315 can store software used by computing device 306, such as an operating system 317, application programs 319, and an associated database 321. Alternatively, some or all of the computer executable instructions for computing device 306 can be embodied in hardware or firmware (not shown).

Computing device 306 can operate in a networked environment supporting connections to one or more remote computers, such as client devices 340. Client devices 340 can be personal computers or servers that include many or all of the elements described above with respect to computing device 306. The network connections depicted in FIG. 3 can include, for example, a local area network (LAN) interface 323 (such as an adapter) connected to a LAN and a wide area network (WAN) interface 327 (such as a modem) connected to a WAN. It will be appreciated that the network connections shown are illustrative and other means of establishing a communications link between the computers can be used.

The embodiments disclosed herein are operational with numerous other general purpose or special purpose computing system environments or configurations. Examples of well-known computing systems, environments, and/or configurations that can be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Client device 340, in some embodiments, can be referred to as a single client device or a single group of client devices, while computing device 306 can be referred to as a single server or a single group of servers. In some embodiments, a single client device 340 communicates with more than one computing device 306, while in other embodiments a single server communicates with more than one client device. Yet in other embodiments, a single client device communicates with a single computing device. Client device 340 can execute, operate, or otherwise provide an application, such as, for example, any one of the following: software; a program; executable instructions; a virtual machine; a hypervisor; or any other set of executable instructions. Client device 340 can display application output generated by an application remotely executing on computing device 306 or other remotely located machine. In one example, the application is a desktop, while in other examples the application is an application that generates a desktop. A desktop can include a graphical shell providing a user interface for an instance of an operating system in which local and/or remote applications can be integrated. Applications, as used herein, are programs that execute after an instance of an operating system (and, optionally, also the desktop) has been loaded.

Computing device 306, in some embodiments, executes a remote presentation client or other client or program that uses a thin-client or remote-display protocol to capture display output generated by an application executing on computing device and transmits the application display output to client device 340. The thin-client or remote-display protocol can be any one of the following protocols: the Independent Computing Architecture (ICA) protocol; or the Remote Desktop Protocol (RDP).

The computing environment can include more than one server such that the servers are logically grouped together into a Virtual Local Area Network (VLAN) as demonstrated in FIG. 2. The VLAN can include servers that are geographically dispersed and logically grouped together in a VLAN, or servers that are located proximate to each other and logically grouped together in a VLAN. Geographically dispersed servers within a VLAN can, in some embodiments, communicate using a WAN, MAN, or LAN, where different geographic regions can be characterized as: different continents; different regions of a continent; different countries; different states; different cities; different campuses; different rooms; or any combination of the preceding geographical locations. When multiple VLANs are grouped together logically, the servers connected to the VLAN belong to the same network group.

In some embodiments, a VLAN can include servers that execute a substantially similar type of operating system platform (e.g., WINDOWS NT, manufactured by Microsoft Corp. of Redmond, Wash., UNIX, LINUX, or SNOW LEOPARD.) The VLAN, in other embodiments, can include servers that execute different types of operating system platforms.

Computing device 306 can be any server type that includes network management device 101 for managing network 100. Such server types can include a file server; an application server; a web server; a proxy server; an appliance; a network appliance; a gateway; an application gateway; a gateway server; a virtualization server; a deployment server; a SSL VPN server; a firewall; a web server; an application server.

Computing device 306 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc.

Client device 340 can, in some embodiments, be a client node that seeks access to resources provided by computing device 306. In other embodiments, computing device 306 can provide one or more client devices (such as client device 340) with access to hosted resources. Computing device 306, in some embodiments, functions as a master node such that it communicates with one or more client devices or servers. In some embodiments, the master node can identify and provide address information associated with a server hosting a requested application, to one or more client devices or server. In still other embodiments, the master node can be a VLAN, a client device 340, a cluster of client devices 340, or an appliance.

Figure 4:
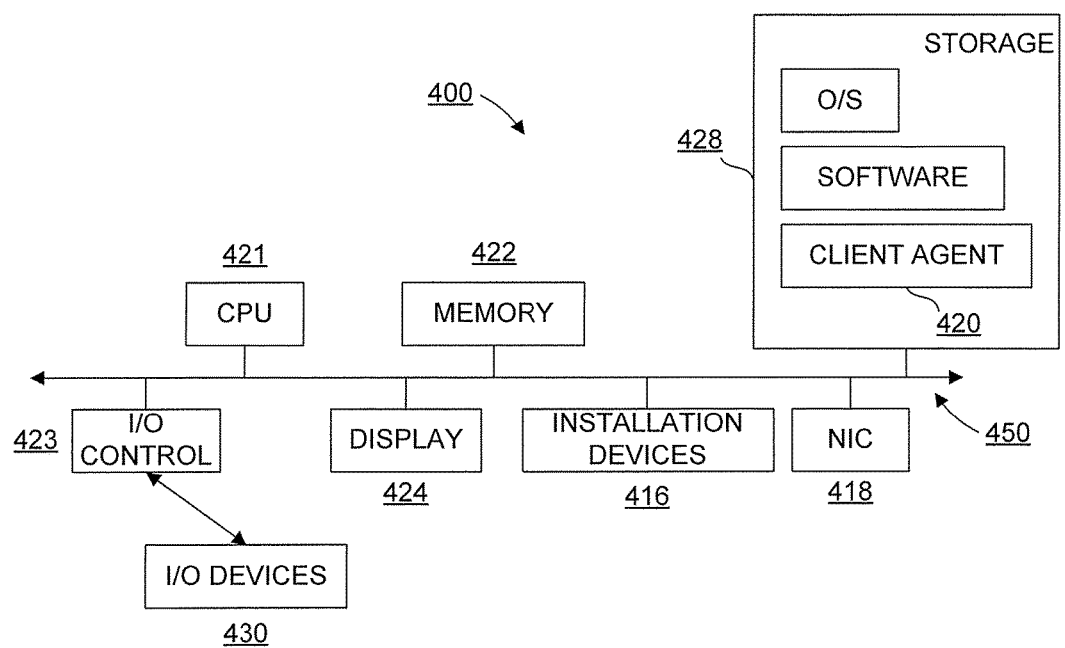
FIG. 4 is an exemplary computing device consistent with the embodiments of the present disclosure.

FIG. 4 is an exemplary computing device 400, consistent with the embodiments of the present disclosure. Computing device 400 can deploy client device 340 and/or computing device 306. Computing device 400 can include a system bus 450 that communicates with the following components: a processing unit 421; a main memory 422; a storage memory 428; an input/output (I/O) controller 423; display device 424; an installation device 416; and a network interface 418. In some embodiments, storage memory 428 includes: an operating system, software routines, and a client agent 420. I/O controller 423, in some embodiments, can be connected to a keyboard, and/or a pointing device. Other embodiments can include an I/O controller 423 connected to more than one input/output device 430.

Figure 5:
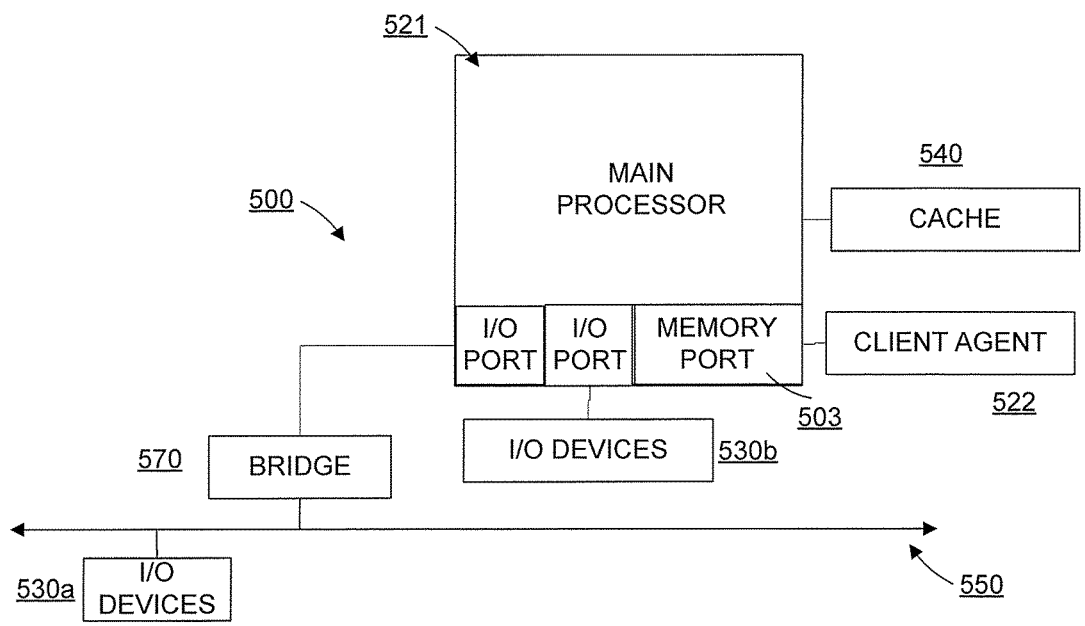
FIG. 5 is an exemplary computing device, consistent with the embodiments of the present disclosure.

FIG. 5 illustrates an exemplary computing device 500, consistent with embodiments of the present disclosure. Computing device 500 can deploy client device 340 and/or computing device 306 illustrated in FIG. 3. Computing device 500 can include, among other things, a system bus 550 that communicates with the following components: a bridge 570, and a first I/O device 530*a*. Bridge 570 can also communicate with a main processor 521, which can further communicate with a second I/O device 530*b* through an I/O port, a client agent 522, and a cache memory 540. Client agent 522 can be a main memory.

Main processor 521 can include, among other things, one or more I/O ports, and a memory port 503. Main processor 521 can be characterized by any one of the following component configurations: logic circuits that respond to and process instructions fetched from the client agent 522; a microprocessor unit; or any other combination of logic circuits.

While FIG. 5 illustrates computing device 500 as including a single processing unit (e.g., processor 521), in some embodiments the computing device 500 can be more than one processing unit. Computing device 500 can store and execute firmware or other executable instructions that, when executed, direct the one or more processing units to simultaneously execute instructions or to simultaneously execute instructions on a single piece of data. In other embodiments, the computing device 500 can store and execute firmware or other executable instructions that, when executed, direct the one or more processing units to each execute a section of a group of instructions. For example, each processing unit can be instructed to execute a portion of a program or a particular module within a program.

In embodiments where the computing device 500 includes one or more processing units, or a processing unit including one or more processing cores, the processors can execute a single instruction simultaneously on multiple pieces of data (SIMD), or in other embodiments can execute multiple instructions simultaneously on multiple pieces of data (MIMD). In some embodiments, the computing device 500 can include any number of SIMD and MIMD processors.

The computing device 500, in some embodiments, includes a memory unit 522 and cache memory 540. The cache memory 540 can be any memory type, and in some embodiments can be any one of the following types of memory: SRAM; BSRAM; or EDRAM. Further embodiments include main processor 521 that can access the memory 522 via: a system bus 550; a memory port 503; or any other connection, bus or port that allows the processor 521 to access memory 522.

Computing device 400/500 can provide support for installation drive 416, which can include, for example, a CD-ROM drive, a CD-R/RW drive, a DVD-ROM drive, tape drives of various formats, USB device, a bootable medium, a bootable CD. The computing device 400/500 can further include a storage device 428 that can be either one or more hard disk drives, or one or more redundant arrays of independent disks; where the storage device is configured to store an operating system, software, programs applications, or at least a portion of the client agent 420.

Computing device 400, 500 can further include a network interface 418 to interface to a Local Area Network (LAN), Wide Area Network (WAN) or the Internet through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above.

In some embodiments, computing device 400 can execute any operating system, while in other embodiments the computing device 400 can execute any of the following operating systems: MICROSOFT WINDOWS; the different releases of the Unix and Linux operating systems; and any version of the MAC OS.

Computing device 400 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a tablet; or any other type and/or form of computing, telecommunications or media device that is capable of communication and that has sufficient processor power and memory capacity to perform the methods and systems described herein.

FIG. 3-5 show a high-level architecture of an illustrative remote desktop system. As shown, the remote desktop system can be single-server or multi-server system, or cloud system, including at least one computing device configured to provide virtual desktops and/or virtual applications to one or more client devices 340. As used herein, a desktop refers to a graphical environment or space in which one or more applications may be hosted and/or executed. A desktop can include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system can be physical (e.g., one operating system per device) or virtual (e.g., many instances of an OS running on a single device). Each application can be executed on a local device, or executed on a remotely located device.

Figure 6:
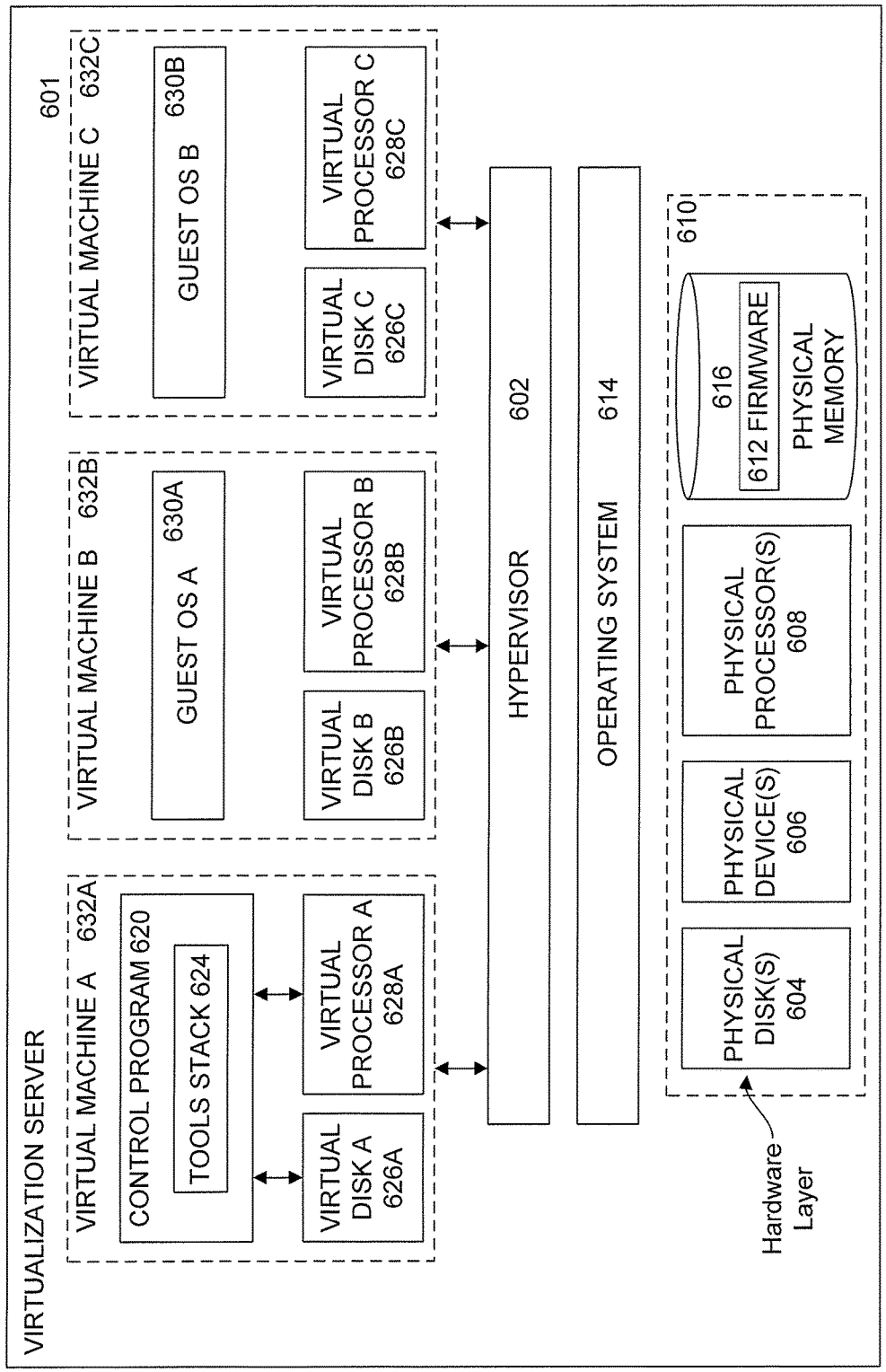
FIG. 6 is a block diagram depicting an exemplary virtualization server, consistent with embodiments of the present disclosure.

FIG. 6 is a block diagram depicting an exemplary virtualization server, consistent with embodiments of the present disclosure. In some embodiments, virtualization server 601 can be configured as a virtualization server in a virtualization environment, for example, a single-server, multi-server, or cloud computing environment. Virtualization server 601 illustrated in FIG. 6 can be deployed as and/or implemented by computing device 306 illustrated in FIG. 3 and/or computing devices 400 and 500 illustrated in FIG. 4 and FIG. 5. Virtualization server 601 can include, among other things, a hardware layer 610 that can include one or more physical disks 604, one or more physical devices 606, one or more physical processors 608, and a physical memory 616.

Physical components 604, 606, 608, and 616 can include, for example, any of the components described above in FIGS. 3-5. For instance, physical disks 604 can include permanent memory storage, temporary memory storage, disk drives (e.g. optical, floppy, tape), hard disks, external hard drives, flash memory, network-attached storage, a storage-area network, or any other storage repository that the virtualization server 601 can access. Physical devices 606 can include any device included in the virtualization server 601 and/or any combination of devices included in virtualization server 601 and external devices that communicate with virtualization server 601.

Physical memory 616 in hardware layer 610 can include any type of memory. Physical memory 616 can store data, and in some embodiments can store one or more programs, or set of executable instructions. FIG. 6 illustrates an embodiment where firmware 612 is stored within physical memory 616 of virtualization server 601. Programs or executable instructions stored in physical memory 616 can be executed by one or more processors 608 of virtualization server 601.

Virtualization server 601 can further include an operating system 614 that can be stored in a memory element in physical memory 616 and executed by one or more of physical processors 608. Still further, a hypervisor 602 can be stored in a memory element in physical memory 616 and can be executed by one or more of physical processors 608. Executing on one or more of physical processors 608 can be one or more virtual machines 632A-C (generally 632). Virtual machine 632A can have a virtual disk 626A and a virtual processor 628A. In some embodiments, a first virtual machine 632A can execute, on a virtual processor 628A, a control program 620 that includes a tools stack 624. As shown in FIG. 6, each of virtual machines 632B and 632C can also have a virtual disk and a virtual processor. Virtual machines 632B-C can execute, on a virtual processor 628B-C, a guest operating system 630A-B.

Virtualization server 601 can also include hypervisor 602 that creates and/or manages any number of virtual machines 632. In some embodiments, hypervisor 602 is a program executed by processors 608 on the virtualization server 601. Hypervisor 602 can be referred to as a virtual machine monitor, or platform virtualization software. In some embodiments, hypervisor 602 can be any combination of executable instructions and hardware that monitors virtual machines executing on a computing machine.

Hypervisor 602, in some embodiments, can provide virtual resources to guest operating systems 630 or control programs 620 executing on virtual machines 632 in any manner that simulates operating systems 630 or control programs 620 having direct access to system resources. System resources can include, among other things, physical devices 606; physical disks 604; physical processors 608; physical memory 616, and any other component included in hardware later 610 of virtualization server 601. Hypervisor 602 can be used to emulate virtual hardware, partition physical hardware, virtualize physical hardware, or execute virtual machines that provide access to computing environments. Hypervisor 602 can also control processor scheduling and memory partitioning for virtual machine 632 executing on virtualization server 601.

Hypervisor 602 can create one or more virtual machines 632B-C (generally 632) in which guest operating systems 630 execute. In some embodiments, hypervisor 602 can load a virtual machine image to create a virtual machine 632. In other embodiments, hypervisor 602 can execute a guest operating system 630 within virtual machine 632. In still other embodiments, virtual machine 632 can execute guest operating system 630. In addition to creating virtual machines 632, hypervisor 602 can control the execution of at least one virtual machine 632. In other embodiments, hypervisor 602 can present at least one virtual machine 632 with an abstraction of at least one hardware resource provided by virtualization server 601 (e.g., any hardware resource available within hardware layer 610).

As shown in the example of FIG. 6, virtualization server 601 can host or execute one or more virtual machines 632. A virtual machine 632 can include a set of executable instructions that, when executed by a physical processor 608, imitate the operation of a physical computer such that virtual machine 632 can execute programs and processes much like a physical computing device. While FIG. 6 illustrates an embodiment where a virtualization server 601 hosts three virtual machines 632, in other embodiments virtualization server 601 can host any number of virtual machines 632. Hypervisor 602, in some embodiments, provides each virtual machine 632 with a unique virtual view of the physical hardware, memory, processor and other system resources available to that virtual machine 632. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, hypervisor 602 can create one or more unsecure virtual machines 632 and one or more secure virtual machines 632. Unsecure virtual machines 632 can be prevented from accessing resources, hardware, memory locations, and programs that secure virtual machines 632 can be permitted to access. In other embodiments, hypervisor 602 can provide each virtual machine 632 with a substantially similar virtual view of the physical hardware, memory, processor and other system resources available to the virtual machines 632.

As stated previously, each virtual machine 632 can include a virtual disk 626A-C (generally 626) and a virtual processor 628A-C (generally 628.) The virtual disk 626, in some embodiments, is a virtualized view of one or more physical disks 604 of virtualization server 601, or a portion of one or more physical disks 604 of virtualization server 601. The virtualized view of physical disks 604 can be generated, provided, and managed by hypervisor 602. In some embodiments, hypervisor 602 provides each virtual machine 632 with a unique view of physical disks 604. Thus, in these embodiments, virtual disk 626 included in each virtual machine 632 can be unique when compared with the other virtual disks 626.

A virtual processor 628 can be a virtualized view of one or more physical processors 608 of virtualization server 601. In some embodiments, the virtualized view of physical processors 608 can be generated, provided, and managed by hypervisor 602. In some embodiments, virtual processor 628 has substantially all of the same characteristics of at least one physical processor 608. In other embodiments, hypervisor 602 provides a modified view of virtual processor 628 such that at least some of the characteristics of virtual processor 628 are different from the characteristics of the corresponding physical processor 608.

Having described various examples of remote desktop systems in FIGS. 3-5 and virtualization servers in FIG. 6, the following paragraphs provide additional examples of various methods and systems relating to: creating virtual machines on a virtualization server 601; connecting physical machines (e.g., computing devices 400/500) and virtual machines 632 to the correct VLAN; creating VLANs; maintaining VLANs; creating network groups; and maintaining network groups. As used herein, a VLAN refers to a set of virtual machines 632 and/or physical machines 400/500 logically grouped together to support one or more tenants in a remote desktop system. A tenant refers to a customer of the remote desktop system. A tenant can be an organization having multiple users with multiple client devices 340 that will be used to access virtual machines 632 and physical machines 400/500 in the remote desktop system.

As described in greater detail below, a network management device 101 can be configured to create a VLAN by selecting a set of physical and/or virtual machines from a pool of unallocated machines, connecting the machines to the appropriate VLAN, and creating a network group for a tenant. In some embodiments, network management device 101 is computing device 400 and/or computing device 500.

Each network group is comprised of one or more VLANs. The physical and/or virtual machines in each VLAN have software that allow a client device 340 to interact directly with the physical and virtual machines in the VLAN. A network management device 101 is used to define certain properties and characteristics of the VLANs and the network groups. Information that the network management device 101 might contain about the VLANs and network groups includes information identifying the machines in the VLANs (e.g., IP address or Medium Access Protocol Address), configuration settings for the VLAN (e.g. limiting traffic between certain clients devices and machines in the VLAN), isolation level of the network group, scope of the network group, and load balancing requirements. Network management device 101 can also define the user, the user's rights, security policies, and set of one or more applications available to tenants of a network group. As an example, network management device 101 can set a particular isolation level for one tenant limiting access to certain software applications hosted on physical or virtual machines in a first network group, and set another isolation level for another tenant enabling access to certain software applications hosted on physical or virtual machines in a second network.

The physical and/or virtual machines in each VLAN can be installed with client applications (e.g., word processing, email, Internet browsing applications, etc.) and can include the software to remotely host and deliver the client applications to the tenant. The machines in the network group can also be configured to function as access gateways and/or web servers. Access gateways can be used to make the secure connections with the client devices 340 and handle authentication credentials (e.g., establishing a virtual private network (VPN)), and web servers can provide the initial web pages to the client devices 340 and then forward the client requests to the application hosting machines in the network group.

Certain tenants can be assigned to a dedicated network group. For example, a highly secure tenant requiring a high level of isolation (e.g. a financial institution, government agency, emergency notification systems) can request an exclusive network group including its own access gateway and web server.

In a system where virtual machines are created on-demand, the VLANs are specified beforehand so that the remote desktop system knows how to create the virtual machines when they are needed. Network management device 101 can define the VLAN in one of two ways. The VLANs can be discovered from existing hypervisors and cloud compute resources, then grouped appropriately by the network management device 101, or the VLANs can be entered and then grouped manually by an administrator. After the network groups are defined, network management device 101 can select a network group to use for specific provisioning and isolation tasks.

It is also important to monitor the number of virtual machines created in a certain VLAN. Adding too many virtual machines to a VLAN could result in network congestion and reduce the overall performance of the network group. Moreover, when selecting existing machines, physical or virtual, or creating new virtual machines, the machines are connected to a VLAN that is accessible by the users and applications that require access to it. To ensure that the users and applications have access to the machines that they are requesting access to, routing is configured between VLANs and is updated appropriately when additional network access is required by machines in the VLAN.

Figure 7:
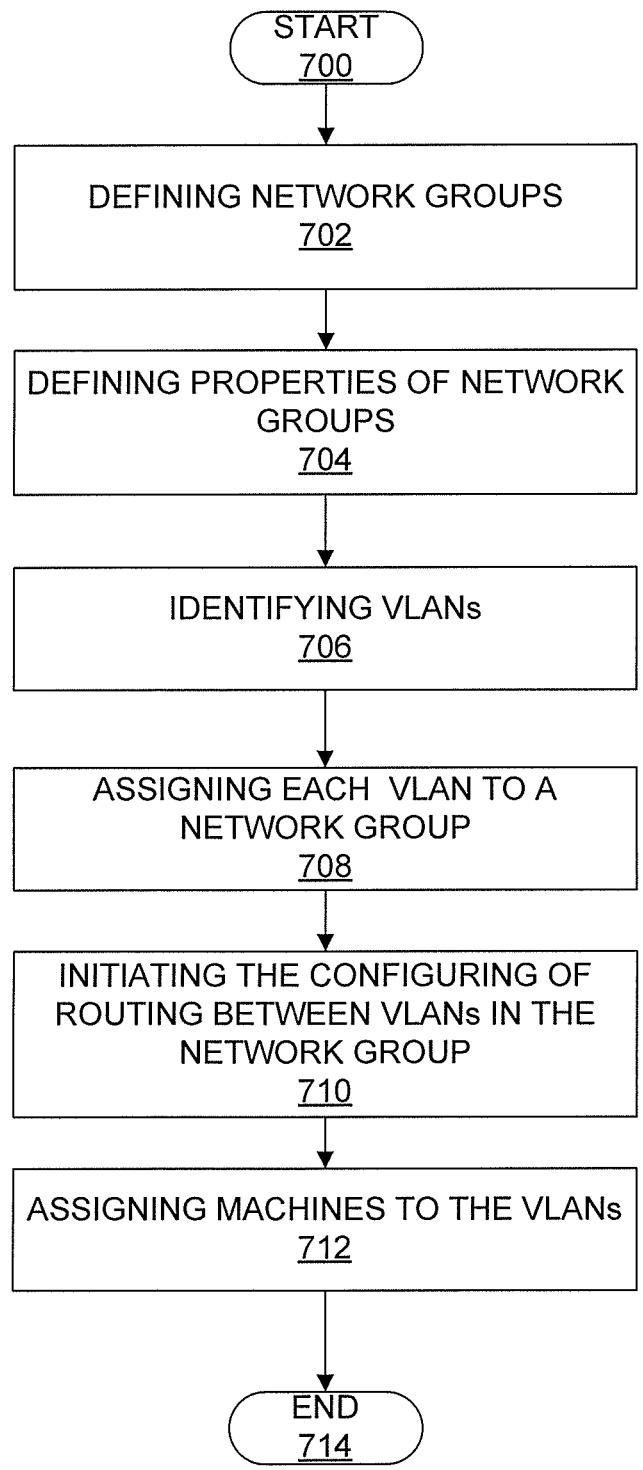
FIG. 7 is a flowchart representing exemplary methods for creating a network group, consistent with embodiments of the present disclosure.

FIG. 7 is a flowchart representing exemplary methods for establishing network groups and network settings, consistent with embodiments of the present disclosure. Referring to FIG. 7, it will be readily appreciated by one of ordinary skill in the art that the illustrated procedure can be altered to delete steps or further include additional steps. After initial start step 700, a network management device (e.g., network management device 101) receives input to define a network group. The network group is a collection of VLANs that can have full routing amongst the VLAN members of that group. While FIG. 7 focuses on VLANs as being part of the network group, it is appreciated that any isolated network, such as a subnet and/or security group, can be included in the network group. In some embodiments, this input can be received from an administrator, and in others it can be received from an automated process.

After the network groups have been defined, the network management device defines properties of the network group (704). The properties of the network group include assigning a maximum number of machines for each VLAN in the network group. In some embodiments, the properties can include additional routing properties of that group, such as whether that network group is isolated, private, or shared. For example, a "shared" network group allows ingress network traffic from multiple tenants; a "private" network group allows egress network traffic to access some limited shared application components; and an "isolated" network group can prevent any ingress or egress traffic other than from a specific set of users.

After the properties of the network group have been defined in step 704, the network management device identifies different VLANs that will be added to the network group (706). In some embodiments, these VLANs can be identified by the network management device requesting that existing hypervisors and other cloud computing resources identify any known VLANs. In some other embodiments, the VLANs can be identified by an administrator entering the VLAN definition into a network management device manually.

After the one or more VLANs are identified, network management device 101 assigns these identified VLANs to the appropriate network group (708). For example a first VLAN can be assigned to a network group associated with an engineering department of an organization and another VLAN can be assigned to a network group associated with a management department of the same organization.

Based on the previous step, network management device 101 can initiate the routing (710) between the different VLANs in the network group. In some embodiments, an automated orchestration system determines the specific network routes required between any two VLANs. For example, network management device 101 can configure the router settings to enable traffic to be sent from the engineering department to the management department, but not vice versa. After completing step 710 network management device 101 assigns the available machines to a VLANs (712). Available machines can include both physical and virtual machines (e.g., physical machines 240 and virtual machines 206). After the machines are assigned, the method can end (714).

Figure 8:
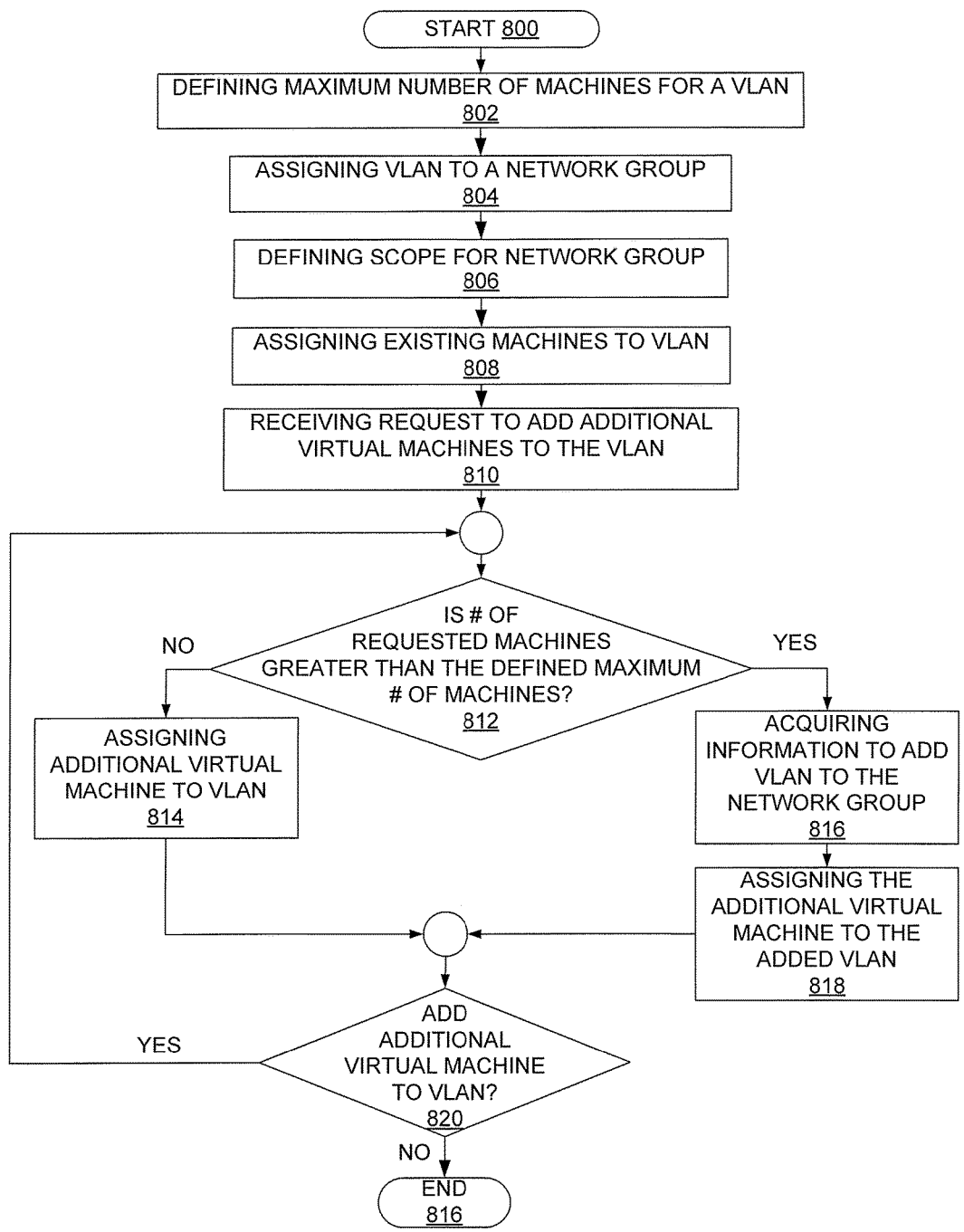
FIG. 8 is a flowchart representing an exemplary method for managing a network group, consistent with embodiments of the present disclosure.

FIG. 8 is a flowchart representing an exemplary method for managing a network group, consistent with embodiments of the present disclosure. It will be readily appreciated by one of ordinary skill in the art that the illustrated procedure can be altered to delete steps or further include additional steps. After initial start step 800, a network management device (e.g., network management device 101) defines a maximum number of machines for a VLAN (802). The network management device can define the maximum number based on input from an administrator or on automated process using, for example, predetermined information assessing an optimal number of machines per VLAN.

The network management device can assign the VLAN to a network group (e.g., network group 250) (804). The network group is a collection of VLANs that can have full routing amongst the VLAN members of that group. While FIG. 8 focuses on VLANs as being part of the network group, it is appreciated that any isolated network, such as a subnet and/or a security group, can be included in the network group. In some embodiments, the network group also indicates restricted routing with other network groups. In some embodiments, the assigning of VLAN to network group in step 804 can occur before the defining of the maximum number of machines for the VLAN in step 802.

The network management device can define a scope for network group (806). The scope represents a set of machines and applications that can communicate with each other for a set of tasks. For example, if an organization sets up an engineering network group and a management network group, the defined scope for the engineering network group could indicate that machines in those VLANs can have access to engineering-related data and applications. The scope could also indicate that machines in the engineering network group would not have access to at least some of the management-related data and applications. In some embodiments, defining the scope in step 806 can occur before step 802 or step 804.

After defining the scope, the network management device assigns existing machines to VLAN (808). Existing machines can include both physical and virtual machines (e.g., physical machines 240 and virtual machines 206). In some embodiments, the network management device assigns existing machines to multiple VLANs in the network group.

After these existing machines have been assigned, in some cases, additional machines may need to be added to the one or more VLANs of the network group. The network management device can either select physical machines that are located on one of the VLANs in the network group or it can create a new virtual machine on one of the VLANs in the network group associated with the scope. When additional machines are needed with the scope of network group, the network management device can receive a request to add additional virtual machines to the VLAN (810).

After receiving the request, the network management device can determine whether the number of requested machines is greater than the defined maximum number of machines for the VLAN specified in step 802 (812). If not, the network management device can assign the additional virtual machine to VLAN (814), and the method proceeds to step 820.

If, however, the number of requested machines is greater than the defined maximum number of machines for the VLAN, the network management device acquires information to add another VLAN to the network group (816). In some embodiments, before the information is acquired in step 816, an alert is displayed on the network management device when the maximum number of machines for a VLAN is exceeded. In some embodiments, the alert message is not displayed until a request to add additional machines to the network group and all VLANs in the network group are at their maximum-number-of-machines threshold. Moreover, if a request to add an additional machine is received and another VLAN in the network group has not met its maximum-number threshold, in some embodiments, the additional machine can be assigned to that other VLAN in the network group.

After the new VLAN is added, the network management device can assign the additional virtual machine to the new VLAN (818), and the method proceeds to step 820. Here, at step 820, the network management device can determine whether additional virtual machines need to be added to VLAN. If so, the method proceeds to step 812. If, however, no additional virtual machines are to be added to VLAN, the method proceeds to end (822).

The methods disclosed herein can be implemented as a computer program product comprising computer-readable instructions. Computer-readable instructions can be stored on a tangible non-transitory computer-readable medium, such as a flexible disk, a hard disk, a CD-ROM (compact disk-read only memory), an MO (magneto-optical) disk, a DVD-ROM (digital versatile disk-read only memory), a DVD RAM (digital versatile disk-random access memory), or a semiconductor memory. Alternatively, the methods can be implemented in hardware components or combinations of hardware and software of a data processing apparatus, e.g., a programmable processor, a computer, or multiple computers. The computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

In the preceding specification, the embodiments have been described with reference to specific exemplary embodiments. It will however, be evident that various modifications and changes can be made without departing from the broader spirit and scope of the exemplary embodiments as set forth in the claims that follow. The specification and drawings are accordingly to be regarded as illustrative rather than restrictive sense. Other embodiments of the present disclosure may be apparent to those skilled in the art from consideration of the specification and practice of the invention disclosed herein.

What is claimed:

1. A network management device comprising:
   a processor; and
   memory storing computer readable instructions that, when executed by the processor, configure the network management device to:
   define a network group;
   define one or more properties of the defined network group, wherein the one or more defined properties provide restricted routing with another network group;
   identify a first and a second isolated networks, wherein the first and the second isolated network each include a plurality of machines and provide restricted routing for the plurality of machines;
   assign the first and the second isolated networks to the defined network group; and
   assign machines to the first or the second isolated networks, wherein the defined network group enables:
   unrestricted routing between a machine assigned to the first isolated network and a machine assigned to the second isolated network; and
   restricted routing between a machine assigned to the first or the second isolated network of the defined network group and a machine assigned to an isolated network of the another network group.

2. The network management device of claim 1 wherein the one or more properties include routing definitions for the network group.

3. The network management device of claim 2 wherein the routing definitions allow data transmissions into the network group.

4. The network management device of claim 2 wherein the routing definitions allow data transmissions out of the network.

5. The network management device of claim 1, wherein the machines include virtual machines and physical machines.

6. The network management device of claim 1, wherein the isolated network is a Virtual Local Area Network.

7. The network management device of claim 1 wherein the properties include assigning a maximum number of machines to an isolated network.

8. The network management device of claim 1 wherein identifying at least one of the plurality of isolated networks involves receiving the identity from a hypervisor.

9. The network management device of claim 1 wherein identifying at least one of the plurality of isolated networks involves receiving the identity from cloud computing resources.

10. The network management device of claim 1 wherein each isolated network is identified by an administrator.

11. The network management device of claim 1, further comprising configuring routes between the plurality of isolated networks of the defined network group.

12. The network management device of claim 1, wherein the unrestricted routing in the application virtualization environment includes packet routing between the assigned plurality of isolated networks, each of the assigned plurality of isolated networks having an assigned machine.

13. A method performed by a network management device configured to create one or more network groups, the method comprising:
defining a network group;
defining one or more properties of the defined network group, wherein the one or more defined properties provide restricted routing with another network group;
identifying a first and a second isolated networks, wherein the first and the second isolated network each include a plurality of machines and provide restricted routing for the plurality of machines;
assigning the first and the second isolated networks to the defined network group; and
assigning machines to the first or the second isolated networks, wherein the defined network group enables:
unrestricted routing between a machine assigned to the first isolated network and a machine assigned to the second isolated network; and
restricted routing between a machine assigned to the first or the second isolated network of the defined network group and a machine assigned to an isolated network of the another network group.

14. The method of claim 13, wherein the one or more properties include routing definitions for the network group.

15. The method of claim 14, wherein the routing definitions allow data transmissions into the network group.

16. The method of claim 14, wherein the routing definitions allow data transmissions out of the network.

17. The method of claim 13, wherein the machines include virtual machines and physical machines.

18. The method of claim 13, wherein the isolated network is a Virtual Local Area Network.

19. The method of claim 13, wherein the properties include assigning a maximum number of machines to an isolated network.

20. The method of claim 13, wherein identifying at least one of the plurality of isolated networks involves receiving the identity from a hypervisor.

21. The method of claim 13, wherein identifying at least one of the plurality of isolated networks involves receiving the identity from cloud computing resources.

22. The method of claim 13, wherein each isolated network is identified by an administrator.

23. The method of claim 13, further comprising configuring routes between the plurality of isolated networks of the defined network group.

24. The method of claim 13, wherein the unrestricted routing in the application virtualization environment includes packet routing between the assigned plurality of isolated networks, each of the assigned plurality of isolated networks having an assigned machine.

25. A method performed by a network management device configured to create one or more virtual machines for an isolated network group the method, comprising:
defining a maximum number of machines for an isolated network;
assigning the isolated network to a network group;
defining the scope of the network group, wherein the scope of the network group defines restricted routing with another network group;
assigning existing machines to the isolated network, wherein the isolated network provides restricted routing for the machines;
receiving a request to add a virtual machine to the isolated network;
responsive to the requested number of machines being greater than the defined maximum number of machines, adding a new isolated network to the network group; and
assigning the additional virtual machine to the added isolated network, wherein the network group enables:
unrestricted routing between the additional virtual machine of the added isolated network and the existing machines assigned to the isolated networks assigned to the network group; and
restricted routing between the additional virtual machine of the added isolated network and a machine assigned to an isolated network of the another network group.

26. The method of claim 25 wherein the virtual machine is added to an existing isolated network if the requested number of machines is less than or equal to the defined maximum number of machines.

27. A network management device comprising:
a processor; and
memory storing computer readable instructions that, when executed by the processor, configure the network management device to:
define a maximum number of machines for an isolated network;
assign the isolated network to a network group;
define the scope of the network group, wherein the scope of the network group defines restricted routing with another network group;
assign existing machines to the isolated network, wherein the isolated network provides restricted routing for the machines;
receive a request to add a virtual machine to the isolated network;
if the requested number of machines is greater than the defined maximum number of machines, add a new isolated network to the network group; and
assign the additional virtual machine to the added isolated network, wherein the network group enables:
unrestricted routing between the additional virtual machine of the added isolated network and the existing machines assigned to the isolated networks assigned to the network group; and
restricted routing between the additional virtual machine of the added isolated network and a machine assigned to an isolated network of the another network group.

28. The network management device of claim 27, wherein the virtual machine is added to an existing isolated network if the requested number of machines is less than or equal to the defined maximum number of machines.

* * * * *